UNITED STATES PATENT OFFICE.

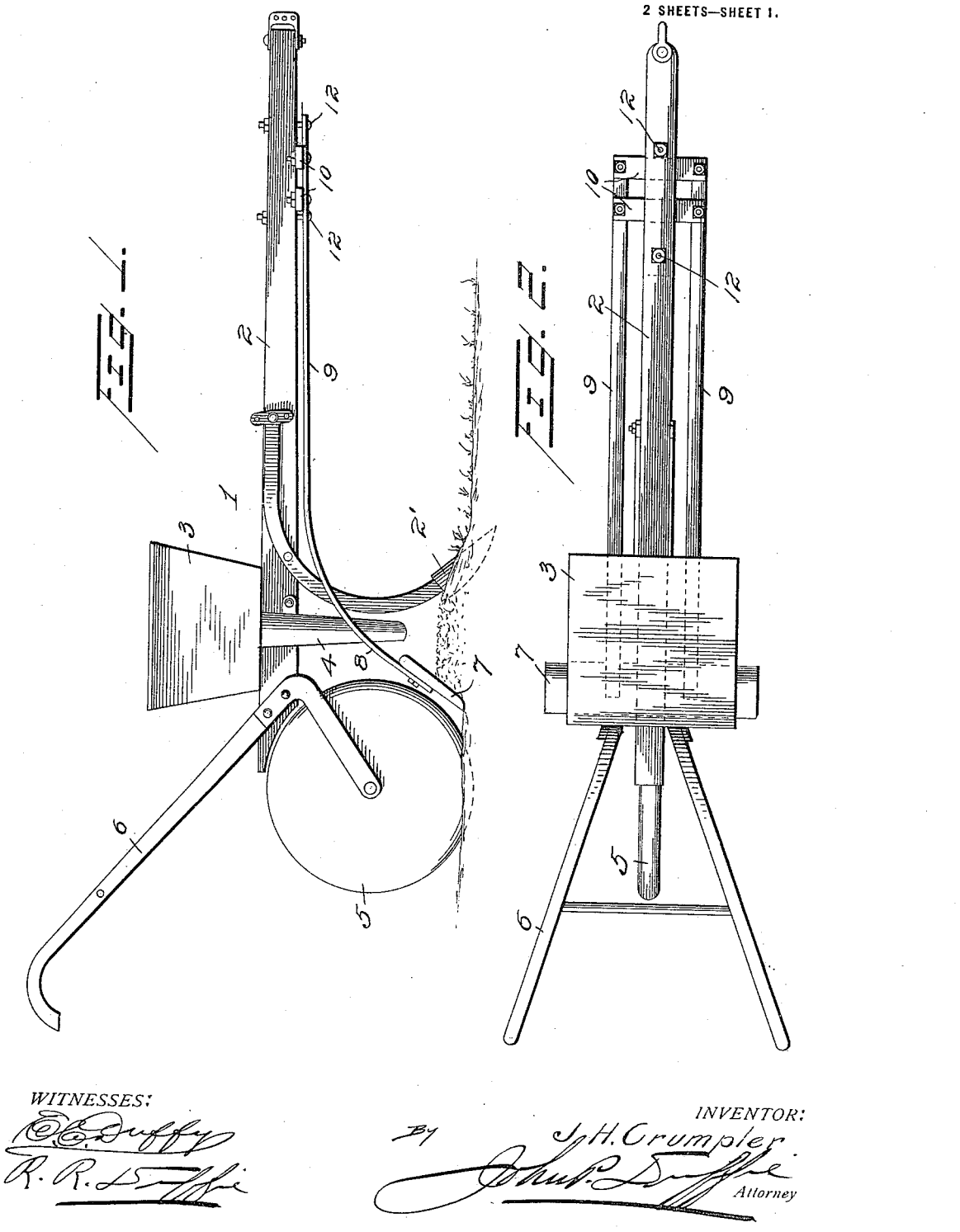

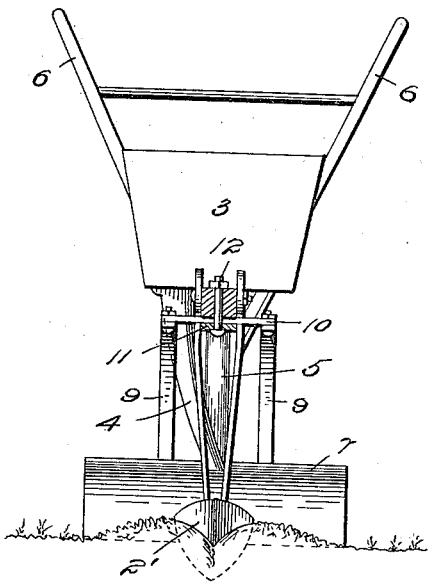
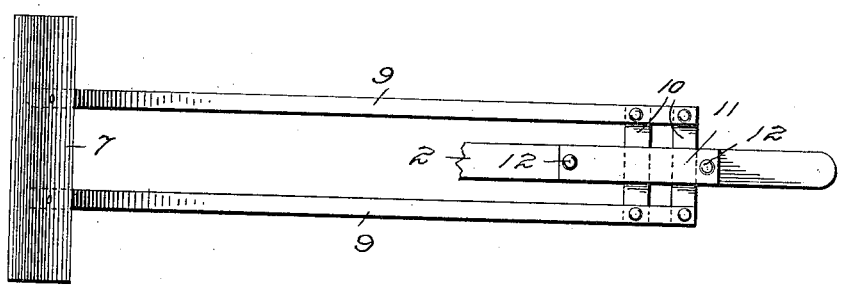

JOSEPH H. CRUMPLER, OF MAGNOLIA, ARKANSAS.

FERTILIZER-DISTRIBUTER ATTACHMENT.

1,144,464. Specification of Letters Patent. Patented June 29, 1915.

Application filed December 9, 1912, Serial No. 735,822. Renewed April 27, 1915. Serial No. 24,351.

*To all whom it may concern:*

Be it known that I, JOSEPH H. CRUMPLER, a citizen of the United States, residing at Magnolia, in the county of Columbia and State of Arkansas, have invented certain new and useful Improvements in Fertilizer-Distributer Attachments, of which the following is a specification.

This invention relates to new and useful improvements in fertilizer distributer attachments and has for its object to provide an attachment of the character specified for the purpose of covering the fertilizer as same is distributed, thus dispensing with the aid of an extra man and horse to cover it with a harrow or other implement.

With the foregoing objects in view, the invention consists in the novel features of construction, combination and arrangement of parts illustrated in the drawings and more particularly pointed out in the appended claim.

In the accompanying drawings:—Figure 1 is a side elevation of a fertilizer distributer equipped with my attachment. Fig. 2 is a plan view of Fig. 1. Fig. 3 is a front end view and Fig. 4 is a reverse plan view of the attachment and the front end of the draft beam of the fertilizer distributer.

In the embodiment illustrated, 1 indicates the fertilizer distributer which may be of any ordinary or approved type consisting of the usual draft beam 2, plow $2^1$, hopper or feed box 3 discharge spout or funnel 4, supporting wheel 5 and handles 6.

The attachment comprises a rectangular oblong-shaped board 7 which is disposed transversely of the fertilizer distributer directly in front of the wheel 5 and directly in rear of the plow 2 and discharge spout or funnel 4 in position to cover the fertilizer dropped or deposited in the furrow made by the plow $2^1$.

The board 7 is suitably attached to the downwardly curved rear ends 8 of the corresponding laterally spaced longitudinally disposed steel bars 9 which are disposed beneath the draft beam 2 in spaced relation with opposite sides thereof. The front ends of the bars 9 terminate at a point near the front end of the draft beam and are bolted or otherwise removably attached to a pair of transversely disposed longitudinally spaced bars 10 which are slidably secured to the bottom edge of the draft beam 2 by the keeper plate 11 attached to said beam by the bolts 12.

By means of the construction and arrangement shown and described, it will be observed that the bars 9 are adjustable backward or forward as is necessary in the successful operation of the machine.

From the foregoing description taken in connection with the drawings, it is thought that the construction, operation and advantages of this invention will be readily understood without requiring a more extended explanation.

Various changes in the form, proportions and minor details of construction will be resorted to without departing from the principles or sacrificing any of the advantages of this invention as defined in the appended claim.

Having described my invention what I claim as new is:—

In combination with a fertilizer distributer comprising a draft beam, plow and feed box, an attachment of the character specified comprising a transversely disposed covering board situated directly in rear of the plow and spout of the feed box, a pair of corresponding longitudinally disposed laterally spaced connecting bars provided with downwardly bent or curved rear ends to which the covering board is attached, said bars extending in a plane beneath the draft beam of the distributer and being spaced from opposite sides thereof, a pair of transversely disposed longitudinally spaced bars to which the front ends of said connecting bars are attached and means for adjustably connecting the transverse bars to the bottom edge of the draft beam, whereby the attachment, as a whole, is capable of forward or backward movement relative to the draft beam, said means comprising a keeper plate extending longitudinally of the draft beam and bolted to the bottom edge thereof.

In testimony whereof I affix my signature in presence of three witnesses.

JOE. H. $\overset{\text{his}}{\times}$ CRUMPLER.
mark

Witnesses:
PAUL BUSTION,
H. P. CARRINGTON.

Attest:
J. E. HAWKINS.

Copies of this patent may be obtained for five cents each, by addressing the "Commissioner of Patents, Washington, D. C."